United States Patent
Lofgren et al.

(10) Patent No.: US 10,425,646 B2
(45) Date of Patent: Sep. 24, 2019

(54) METHOD OF AND APPARATUS FOR PROCESSING VIDEO IMAGE DATA

(71) Applicant: Arm Limited, Cambridge (GB)

(72) Inventors: Johan Lofgren, Lund (SE); Fredrik Peter Stolt, Lund (SE)

(73) Assignee: Arm Limited, Cambridge (GB)

( * ) Notice: Subject to any disclaimer, the term of this patent is extended or adjusted under 35 U.S.C. 154(b) by 72 days.

(21) Appl. No.: 15/698,612

(22) Filed: Sep. 7, 2017

(65) Prior Publication Data

US 2019/0075298 A1 Mar. 7, 2019

(51) Int. Cl.
| | | |
|---|---|---|
| *H04N 19/139* | (2014.01) | |
| *H04N 19/52* | (2014.01) | |
| *H04N 19/176* | (2014.01) | |
| *H04N 19/105* | (2014.01) | |
| *H04N 19/147* | (2014.01) | |
| *H04N 19/11* | (2014.01) | |

(52) U.S. Cl.
CPC ......... *H04N 19/139* (2014.11); *H04N 19/105* (2014.11); *H04N 19/11* (2014.11); *H04N 19/147* (2014.11); *H04N 19/176* (2014.11); *H04N 19/52* (2014.11)

(58) Field of Classification Search
CPC .... H04N 19/139; H04N 19/105; H04N 19/52; H04N 19/176
USPC ........................................... 375/240.2
See application file for complete search history.

(56) References Cited

U.S. PATENT DOCUMENTS

2007/0253484 A1* 11/2007 Zhao ............... H04N 19/176
                                              375/240.13

* cited by examiner

*Primary Examiner* — Nam D Pham
(74) *Attorney, Agent, or Firm* — Vierra Magen Marcus LLP

(57) ABSTRACT

When generating intra-frame encoding cost measures for evaluating intra-frame encoding of a frame of video image data, a measure of the cost of intra-frame encoding a block of the frame is determined by determining a separate cost measure for each sub-block of a set of plural sub-blocks making up the block to be encoded, and then determining the measure of the cost of encoding the block to be encoded as the sum of the determined cost measures for each of the sub-blocks.

20 Claims, 5 Drawing Sheets

METHOD OF AND APPARATUS FOR PROCESSING VIDEO IMAGE DATA

BACKGROUND

This technology described herein relates to the processing of video data, and in particular to methods of and apparatus for encoding video image data.

So that video images may be generated by one device (e.g. a video camera) and then transmitted (streamed) over a link (e.g. via the internet) to be viewed on another device (e.g. a computer), video image data (e.g. RGB or YUV values) is generally encoded for transmission in the format of an encoded bitstream, according to a predetermined video encoding format, such as HEVC, H264, VP8 and VP9. Video encoding formats can enable a significant reduction in the file size of video image data (which thus aids the efficient streaming of the video image data) without a significant visible loss of image quality when the video images are viewed.

Video image data is typically generated as a sequence of frames and these frames may be encoded in a number of different ways. To enable efficient encoding of the video image data, in "differential" video coding standards such as HEVC, H264, VP8 and VP9, the frames may be split up into smaller blocks which are then encoded relative to each other, e.g. to take into account differences between the blocks. For a frame of video image data being encoded, such "source" blocks may be encoded relative to corresponding "reference" blocks in other (e.g. previously encoded) frames in the sequence of frames (using an "inter-frame" encoding mode) or to other (e.g. previously encoded) blocks in the same frame (using an "intra-frame" encoding mode). The technology described herein relates to the latter, "intra-frame", mode of encoding.

In an "intra-frame" mode of encoding, there are a number of different ways in which source blocks in a frame may be encoded relative to other (e.g. previously encoded) reference blocks in the same frame. This may be done by encoding the video image data associated with pixels in a block of a frame relative to the (e.g. already encoded) pixels at the edge of a neighbouring block, e.g. by determining the differences ("residuals") between the data represented at the pixels in the block being encoded and the pixels at the edge of the neighbouring block. Different neighbouring edges (e.g. to the left or above the block being encoded), where available, may be used as a basis for performing the encoding. The pixels of these neighbouring edges may be projected into the block being encoded in different directions (e.g. vertically, horizontally or diagonally, where possible).

To determine the most cost effective way in which to encode a frame of video image data (e.g. that uses the least amount of data), a number of different ways of encoding a frame may be tested, and their respective "costs" determined. The different encoding options may comprise, for example, projecting the pixels from a neighbouring block in different directions into the block to be encoded in order to calculate the residuals in the block to be encoded and/or by using blocks of different sizes when determining the residuals. Once the costs of the different encoding options have been calculated, the encoding option that, e.g., minimises the overall cost of encoding that part or all of the frame of video image data may be chosen and (that part of) the frame encoded accordingly.

As will be appreciated, it can be expensive computationally to calculate multiple cost predictions for multiple different encoding options, such as block sizes and for different projection directions, to determine which is the most cost effective intra-frame encoding scheme to use. The Applicants believe that there remains scope for improved methods of and apparatus for estimating intra-frame encoding costs in video encoding.

BRIEF DESCRIPTION OF THE DRAWINGS

A number of embodiments of the technology described herein will now be described by way of example only and with reference to the accompanying drawings, in which.

DETAILED DESCRIPTION

Figure 1:
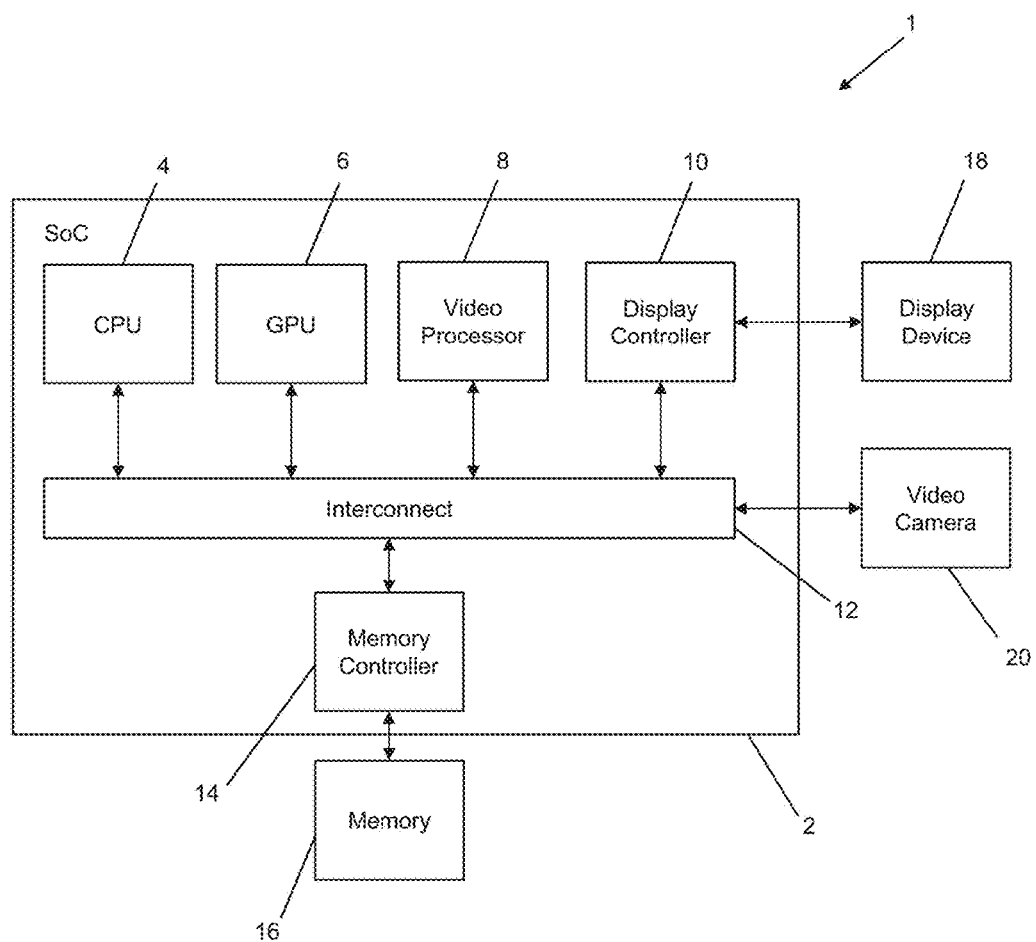
FIG. 1 shows an exemplary data processing system in which the technology described herein may be implemented.

One embodiment of the technology described herein comprises a method of generating an intra-frame encoding cost measure for a block of data elements of a video frame being encoded, the method comprising:

for a block of data elements in a frame of video image data to be encoded using intra-frame encoding:

determining a measure of the cost of encoding the block of data elements to be encoded when using the data values of data elements of another block of data elements in the frame of video image data as a reference set of data values for the block of data elements to be encoded by:

determining, for each sub-block of a set of plural sub-blocks of data elements making up the block of data elements to be encoded, a measure of the cost of encoding the sub-block when encoding the block of data elements to be encoded using data values of the data elements from the another block in the frame of video image data as a reference set of data values for the block of data elements to be encoded; and determining the measure of the cost of encoding the block of data elements to be encoded using the determined cost measures for each of the sub-blocks of data elements making up the block of data elements.

Another embodiment of the technology described herein comprises an apparatus for generating intra-frame encoding cost measures for blocks of data elements of video frames being encoded, the apparatus comprising:

processing circuitry configured to:

for a block of data elements in a frame of video image data to be encoded using intra-frame encoding:

determine a measure of the cost of encoding the block of data elements to be encoded when using the data values of data elements of another block of data elements in the frame of video image data as a reference set of data values for the block of data elements to be encoded by:

determine, for each sub-block of a set of plural sub-blocks of data elements making up the block of data elements to be encoded, a measure of the cost of encoding the sub-block when encoding the block of data elements to be encoded using data values of the data elements from the another block in the frame of video image data as a reference set of data values for the block of data elements to be encoded; and determine the measure of the cost of encoding the block of data elements to be encoded using the determined cost measures for each of the sub-blocks of data elements making up the block of data elements.

The technology described herein relates to a method of and an apparatus for generating intra-frame encoding cost measures when encoding frames of video image data using an intra-frame mode of encoding (i.e. where blocks of video image data in a frame to be encoded are encoded relative to other (e.g. previously encoded) blocks of video image data in the same frame). These cost measures can then be used to select how the frame of video image data is to be encoded, e.g. in a cost effective manner.

In the technology described herein, the cost measure for encoding a block of data elements of a video frame being encoded is determined by determining a separate cost measure for encoding (as part of the block to be encoded) each of a plurality of sub-blocks that make up the block, and then using (e.g. summing) the individual sub-block cost measures to provide a cost measure for the (overall) block. Looked at another way, a cost "contribution" from each sub-block to the cost of encoding the block as a whole is determined, and then the individual sub-block cost contributions used to determine an encoding cost measure for the block as a whole.

As will be discussed further below, the Applicants have recognised that cost measures for smaller sub-blocks making up a larger block of data elements can be used (e.g. summed) to provide a suitable cost measure for the larger block of data elements when performing intra-frame video encoding. This in itself may reduce the processing burden when trying to determine a cost measure for encoding the block of data elements.

Furthermore, and as the Applicants have recognised, and as will be discussed further below, the determined cost measure for a sub-block of a block of data elements may also be able to be used as a cost measure for the encoding of the sub-block per se, and/or for determining the cost of encoding a different block of data elements that the sub-block is (also) part of. This then means that (at least some of) the cost measures determined for the sub-blocks can be "re-used" for other cost measure determinations, e.g. when cost measures are to be determined for encoding the sub-blocks individually, and not just as part of a larger block that they are from.

Being able to "re-use" and re-using, the sub-block cost measures in this way means, for example, that the number of processing operations and the data needed to be stored to determine cost measures for plural different encoding options that are being considered may be reduced, e.g. because the cost measures that have been determined already may be able to be re-used rather than having to be determined again. This can then reduce, for example, the time, power and processing resources used for a given number of cost determinations.

The technology described herein is to be used when encoding video frames using a blockwise, intra-frame encoding process.

Thus a video frame to be encoded will be divided into respective blocks of data elements (e.g. pixels or sampling positions) representing respective regions (areas) of the video frame, which blocks are then respectively individually encoded, e.g. to produce an encoded video image data bitstream (e.g. such that respective individual blocks can subsequently be identified and decoded from the encoded video image data).

When performing such intra-frame encoding of a video frame, a number of different possible ways of dividing and encoding the video frame as respective blocks of data elements may be considered, with each possible subdivision arrangement being assessed, e.g. in terms of some form of "cost" measure, to determine, e.g., a more effective subdivision arrangement to use when encoding the video frame (which determined subdivision arrangement will then be used to derive the actual encoded version of the frame that is produced and, e.g., stored and/or transmitted for further use). Accordingly, as part of this processing, a respective cost measure may be determined for encoding a given block of data elements of the video frame (and for each of plural different blocks of data elements of the video frame), so as to allow the different encoding arrangements and options to be evaluated.

The technology described herein relates to a method of and apparatus for deriving the cost of encoding a given block of data elements of a video frame for this purpose.

The technology described herein may be used to determine a cost measure for a single block of data elements of a frame of video image data to be encoded, but in an embodiment, cost measures are determined in the manner of the technology described herein for plural (different) blocks of data elements for a frame of video image data to be encoded, and, in an embodiment, for sufficient blocks of data elements in a frame so as to allow costs for encoding the entire frame to be encoded using an "intra-frame" encoding process to be evaluated.

Thus, in an embodiment cost measures are determined in the manner of the technology described herein for plural different blocks of data elements of a (and the) video frame being encoded.

As will be discussed further below, it would also be possible to determine plural different cost measures for a given block of data elements of a video frame being encoded (and in an embodiment, this is done).

A (and each) block of data elements that a video frame is divided into for the encoding process (and for which an encoding cost measure is determined) can be any suitable and desired block of data elements (e.g. pixels or sampling positions) representing a respective region (area) of the video frame. Each block of data elements will comprise a suitable block of (contiguous) data elements of the overall array of data elements that make up the video frame being encoded.

The (and, e.g., each) block of data elements to be encoded may be any suitable and desired shape and size. In an embodiment the (and, e.g., each) block is smaller than the size of the frame (such that the frame is processed as a plurality of blocks).

In an embodiment the blocks are rectangular in shape, e.g. square. The rectangular blocks may take any suitable and desired size. In an embodiment the rectangular blocks each have a size between and including 8×8 data elements (e.g. pixels) and 64×64 data elements, e.g. with each edge of the rectangular blocks having a size of $2^n$ data elements, where n is an integer (e.g. between and including 3 and 6).

In an embodiment the (and each) block of data elements for which a cost measure determined in the manner of the technology described herein is a block of data elements that the video encoding process (e.g. standard) being used to encode the video frame is able to, and would normally, operate on (and encode). For example, many video encoding processes (e.g. standards) support a number of different block sizes for encoding purposes, and so in an embodiment, the (and each) block of data elements for which a cost measure is determined in the manner of the technology described herein comprises a block of data elements that would be considered and supported for encoding purposes for the video encoding process (e.g. standard) being used.

Where a set of plural blocks of data elements is considered in the manner of the technology described herein (for a given video frame), then the blocks that are considered may each be the same shape and size (but have a different position within the frame), or may have different sizes and/or shapes to other blocks that are considered for the frame. (Correspondingly, different sizes, shapes and/or numbers of blocks may be considered for different video frames, e.g. depending on the respective data content of the frames.)

It would also be possible (and indeed in an embodiment this is done) to consider cost measures for different size blocks occupying (from) the same region (area) of the video frame when desired. This would be appropriate where, for example, the encoding process operates to consider whether a given area of a video frame should be encoded, e.g., using a single larger block or plural smaller blocks within that larger block.

In an embodiment, a set of plural blocks of data elements that, collectively, encompasses (covers) the entire video frame is considered in the manner of the technology described herein for the video frame. In an embodiment that set of plural blocks of data elements comprises blocks of different sizes and/or shapes, and, for example, also includes blocks that occupy (are from) the same region (area) of the video frame.

In an embodiment, where a set of plural blocks of data elements is considered in the manner of the technology described herein for a given video frame, then at least some of the blocks of data elements that are considered may have different positions within the frame (whether the blocks themselves are the same or a different size and shape). Thus, in an embodiment there will be plural blocks of data elements occupying different positions within a (and the) video frame being encoded that are considered in the manner of the technology described herein.

A (and the) block of data elements for which a cost measure is to be determined is divided into a plurality of sub-blocks of data elements making up the block of data elements for the purpose of determining the cost measure.

In an embodiment a (and the) block of data elements is divided into plural, non-overlapping, sub-blocks (i.e. so that each sub-block covers a different area (a different set of the data elements of) of the overall block of data elements that is being considered. Thus, in an embodiment, a block of data elements is divided into (and the cost measure determined using) a set of plural sub-blocks that tessellate (without overlapping) over the area of the block of data elements being considered.

In an embodiment each sub-block of data elements for a block of data elements that is considered for the purposes of the technology described herein (and for which a separate cost measure is determined) accordingly comprises a suitable subset (sub-array) of the data elements of the block of data elements (and, in an embodiment, a contiguous sub-block of data elements).

The sub-blocks of data elements that are considered for the purposes of the technology described herein may take any suitable and desired form (shape and size) (that is smaller than the overall block of data elements that the sub-blocks make up).

In an embodiment the sub-blocks are rectangular in shape, e.g. square. The rectangular sub-blocks may take any suitable and desired size, e.g. relative to (i.e. smaller than) the block that they are from. In an embodiment the rectangular sub-blocks each have a size between and including 4×4 data elements (e.g. pixels) and 32×32 data elements, e.g. with each edge of the rectangular blocks having a size of $2^n$ data elements, where n is an integer (e.g. between and including 2 and 5).

A block of data elements may be divided into any suitable and desired number of plural sub-blocks, e.g. depending upon the relative sizes of the data block and the sub-blocks. In an embodiment a block of data elements is divided into $2^n$ sub-blocks, where n is an integer (e.g. between and including 2 and 4). Thus in an embodiment, a block of data elements is divided into 2, 4, 8 or 16 sub-blocks for the purposes of determining the cost measures in the manner of the technology described herein.

A block of data elements may be divided into sub-blocks (for which cost measures are determined) of plural different sizes and/or shapes, but, in an embodiment, is divided into sub-blocks of the same size and shape.

Thus, in an embodiment, a block of data elements is divided into plural sub-blocks each having the same size and shape (but different positions within the block of data elements) for the purposes of determining the cost measures in the manner of the technology described herein.

Correspondingly, while it would be possible for different data blocks within a given frame being encoded to be divided into different sized and/or shaped sub-blocks to the other data blocks of the video frame being encoded, in an embodiment each block of data elements that is considered for a video frame being encoded in the manner of the technology described herein is divided into (and processed using) the same size and shape of sub-blocks. In other words, the same sub-block size and shape is preferably used for determining the cost measures for all (for each and every) block of data elements of a video frame being encoded for which cost measures are determined in the manner of the technology described herein.

Correspondingly, in an embodiment, the same sub-block size and shape is used for each video frame of a sequence of video frames being encoded (although that is not essential).

In an embodiment, the sub-blocks of data elements of a block of data elements that are considered for the purposes of the technology described herein also comprise block sizes and shapes (and block positions and configurations) that correspond to blocks of data elements that the video encoding process (e.g. standard) being used to encode the video frame is able to, and would normally, operate on (and encode). Thus, in an embodiment, the (and each) sub-block of data elements for which a cost measure is determined in the manner of the technology described herein comprises a block of data elements that would be considered and supported for encoding purposes for the video encoding process (e.g. standard) being used.

In an embodiment, the sub-blocks that are considered for the purposes of the technology described herein comprise the smallest block size that is supported and used for encoding purposes in the video encoding process (e.g. standard) in question.

The cost measure that is determined for a sub-block of data elements (and accordingly that is determined for an overall block of data elements being considered) in the technology described herein can comprise any suitable and desired measure of the cost of encoding the sub-block using an intra-frame encoding process.

In intra-frame encoding, a given block of data elements to be encoded is encoded by using the data values of data elements of another block of data elements in the frame of video image data to derive a respective reference data value for each data element of the block of data elements to be encoded. The differences between the actual values of the data elements of the block of data elements being encoded, and the derived reference data values for the data elements are then determined, and then, inter alia, encoded as a set of difference ("residual") values. The difference values ("residuals") can then be added to the (derived) reference data values when decoding the block to determine the actual data values to use for the decoded block.

Typically for this process, the data values of the data elements in the row, column, or diagonally at the perimeter of a (contiguous) adjacent block of data elements (e.g. that has previously been encoded) in the video frame being encoded are, in effect, repeated along the corresponding rows, columns, or diagonals for the block of data elements being encoded, to thereby provide a respective reference data value for each data element of the block of data elements to be encoded.

This can be visualised as projecting the data values of the data elements at the edge of the adjacent block of the video frame into the block being encoded in a particular (e.g. horizontal, vertical or diagonal) direction (such that a data element from the perimeter of the adjacent block(s) is projected onto each of the data elements in the corresponding row, column or diagonal of the block being encoded along that direction).

Thus, in an embodiment, the another block of data elements in the frame of video data from which the data values that are used a reference set of data values for the block of data elements to be encoded are taken comprises another block of data elements in the video frame that is being encoded that is adjacent to (and, e.g., contiguously adjacent to) the block being encoded. Thus, in an embodiment, it is another block of the frame of video image data that is contiguous with an edge and/or a corner, of the block of data elements to be encoded. In an embodiment the another block of data elements that is used to derive the reference set of data values for the block of data elements to be encoded comprises a previously encoded block of the frame of video image data.

Correspondingly, in an embodiment the data elements of the another block of data elements in the frame of video image data whose data values are used as a reference set of data values for the block of data elements to be encoded comprise the data elements of the another block of data elements that are adjacent to, and, e.g., that are contiguous with, the block of data elements to be encoded.

Thus, for example, where the another block of data elements is vertically above the block of data elements to be encoded in the video frame, in an embodiment the data values of the bottom row of that another block of data elements are used as the reference set of data values for the block of data elements to be encoded. Correspondingly, where the another block of data elements that is being used as a reference lies immediately to the left of the block of data elements to be encoded, in an embodiment the data values of the rightmost column of data elements in the another block of data elements are used as the reference set of data values for the block of data elements to be encoded.

It would also be possible for a given block of data elements to be encoded to use data values of data elements from more than one other block of data elements to derive the reference set of data values for the block of data elements to be encoded. This may be the case, for example, where a "diagonal" projection of the data values of data elements in other blocks of data elements is used to derive the reference set of data values for the block of data elements to be encoded.

Other arrangements would, of course, be possible (e.g. depending upon exactly how the intra-frame encoding is configured to operate for the video processing system (e.g. standard) in question).

The cost measure that is determined for a sub-block of data elements (and accordingly that is determined for an overall block of data elements being considered) in the technology described herein is (correspondingly) n an embodiment (at least) representative of and/or based on the differences (the "residuals") between the reference set of data values for the block of data elements that has been derived from the data values of data elements of another block of data elements of the frame of video image data and the actual data values of the data elements of the sub-block (and overall block) in question.

In an embodiment, the cost measure for a sub-block comprises a measure of the overall differences between the actual data values for the sub-block and the corresponding data values derived for the sub-block when using the data values from the data values of the data elements of the another block of data elements in the frame of video image data as a reference set of data values for the block of data elements to be encoded. In an embodiment, the cost measure comprises a sum (a total) of the difference values for the sub-block.

In one such embodiment, the cost measure for a (and each) sub-block being considered comprises a sum of absolute differences (SAD) for the data elements making up the sub-block (i.e. a sum of the absolute values of each difference between the actual data value of a data element of the sub-block of the block to be encoded, and the corresponding reference data value for that data element of the block to be encoded that has been derived from a data value of the another data block that is being used as a reference for the block of data elements to be encoded).

In an embodiment, the cost measure comprises a sum of absolute transformed differences (SATD) for the data elements making up the sub-block. In an embodiment this comprises taking a frequency transform (e.g. a Hadamard transform) of the differences calculated between the actual data values of the data elements of the sub-block and the corresponding reference data values for the data elements of the block to be encoded that have been derived from the data values of the another data block that is being used as a reference for the block of data elements to be encoded, and then summing (accumulating) (totalling) the absolute values of the transformed differences.

The Applicants have recognised in this regard that although using a measure such as a SAD or SATD to determine a measure of the cost of encoding a sub-block of data elements (and correspondingly of the overall block of data elements to be encoded) may not provide as accurate a cost measure as compared to, for example, determining a cost measure using more sophisticated approaches (such as by applying a discrete cosine transformation (DCT) to the difference values (residuals), such less sophisticated cost measures can still provide sufficiently accurate cost measures to allow suitable encoding decisions based on those cost measures to be made, and that, moreover, in contrast to, for example, the use of discrete cosine transformations, they can more readily be combined for multiple sub-blocks to provide a suitable (and usable) cost measure for a larger block of data elements comprising the plural sub-blocks.

Furthermore, the simpler nature of a measure such as SAD or SATD helps to reduce the number of calculations performed when determining a cost measure and therefore helps to reduce the power consumption and the time taken to determine the cost measures.

The cost measures determined for the sub-blocks individually may be used to provide the encoding cost measure for the (entire) block of data elements to be encoded in any suitable and desired way, e.g. depending on how the cost measures have been determined for the sub-blocks in the first place. In an embodiment, each of the sub-block cost measures in question are summed (accumulated) (totalled) to provide the cost measure for a (and the) the block of data elements.

(Using SAD or SATD values for each sub-block has the advantage that those values may simply be summed to determine an SAD or SATD, respectively, cost measure for the block to be encoded as a whole.)

In an embodiment the determined cost measure(s) are written out, e.g. to memory. This helps the cost measure(s) to be used by the apparatus (or components of a larger system) in the encoding of the frame of video image data. The cost measure(s) may be written out after the cost measure(s) have been determined for all of the sub-blocks in the block to be encoded.

However, in an embodiment the cost measures determined for the sub-blocks are written out individually each time after they have been determined for the respective sub-blocks in the block to be encoded. As the cost measures determined for the sub-blocks in a block to be encoded are written out, in an embodiment the cost measures are accumulated (e.g. summed, e.g. as outlined above) for a block to be encoded, to form the cost measure(s) for the block to be encoded.

In an embodiment the cost measures are associated with an indication of the block to be encoded and/or the sub-block of the block to be encoded that the cost measures were determined for. This helps the cost measures to be identified later, e.g. when encoding the frame of video image data.

While it would be possible simply to determine a single cost measure (e.g. using one reference block from the video frame) for a given block of data elements to be encoded, in an embodiment, plural cost measures are determined (in the manner of the technology described herein) for a given block of data elements to be encoded (where it is possible to do that). These plural different cost measures may correspond, e.g., to using different blocks of the video frame as reference blocks for the block of data elements to be encoded. For example, where a block of data elements to be encoded has another encoded block above it and another encoded block to its left, then respective cost measures could be determined for encoding the block of data elements to be encoded both when using the adjacent block in the horizontal direction as a source of reference data values and when using the vertically adjacent block as a source of reference data values, for the intra-frame encoding process.

Thus, in an embodiment the method comprises (and the processing circuitry is configured to) determining a plurality of (different) measures of the cost of encoding a block of data elements, with each cost measure corresponding to a different way of encoding the block when using data values of data elements of another block of data elements in the frame of video image data for a reference set o data values for the block of data elements to be encoded.

Where plural cost measures are determined in the manner of the technology described herein for a block of data elements to be encoded, then in an embodiment, the plural cost measures are compared with each other, and used when selecting, and to select, how to encode (e.g. more optimally) the block of data elements in question.

The number of different cost measures that are determined for a given block of data elements to be encoded may depend upon, and be based on, for example, the number of different encoding alternatives that would (normally) be considered for a block of data elements when using the video encoding process (e.g. standard) in question.

In these arrangements, each different way of encoding the block for which a cost measure is determined may differ from the other ways of encoding the block that are being considered in any suitable and desired manner.

Thus they may, for example, and in an embodiment do, each comprise encoding the block using a respective different another block of data elements as the source of the reference set of data values for the block of data elements to be encoded.

Correspondingly, a separate cost measure may be determined for each different direction in which the data elements in the other block(s) can be projected into the block to be encoded, e.g. a separate cost measure for one or more of, in an embodiment plural of, and in an embodiment for each of, the horizontal, vertical and diagonal directions (where available). (It will be appreciated that for some blocks to be encoded only certain projection directions will be available, e.g. owing to the number and/or relative positions of the other block(s) that are contiguous with the block to be encoded.)

In an embodiment, cost measures are determined using all of the available (e.g. previously encoded) other blocks (e.g. that are contiguous with the block to be encoded), and/or all of the available directions in which the data elements from the other block(s) may be projected into the block to be encoded.

The technology described herein has been described above primarily with reference to determining a cost measure or measures for encoding a given block of data elements by determining respective costs for a plurality of sub-blocks making up the block of data elements. However, as discussed above, in an embodiment, cost measures are determined for plural different blocks of data elements for the video frame to be encoded (which the actual encoding of the video frame then being determined based on the cost measures determined for the different respective blocks of data elements).

The Applicants have further recognised in this regard that as well as being able to determine a cost measure for intra-frame encoding a block of data elements by determining and appropriately combining (e.g. summing) cost measures for respective sub-blocks of data elements making up the overall block of data elements, the cost measures determined for sub-blocks of data elements as part of that cost determination process can also be used for determining a cost measure for other blocks of data elements, such as, and in particular, other blocks of data elements that fall within (that are encompassed by) the block of data elements being considered and that also can be constructed (formed) from respective sub-blocks of data elements of that larger block of data elements for which respective cost measures have been determined.

Thus, in an embodiment, as well as determining a measure of the cost of encoding the block of data elements by combining cost measures for each of the plurality of sub-blocks of data elements making up that block of data elements, the determined cost measures for at least some of the sub-blocks of data elements making up the block of data elements are also used (e.g. combined, and in an embodiment summed, as discussed above), to determine a cost measure for intra-frame encoding a different block of data elements of the frame of video image data being encoded.

In an embodiment, a cost measure for intra-frame encoding a different block of data elements is determined using the determined cost measures for some but not all of (for a subset of) the sub-blocks of data elements for which cost measures were determined when determining the cost measure for the initial block of data elements. In an embodiment this is done for plural different blocks of data elements (that are different to the initial block of data elements).

"Re-using" the cost measures determined for sub-blocks of data elements when determining a cost measure for a larger block of data elements to also determine cost measures for other blocks of data elements further helps to reduce the number of cost measure determining operations, etc., that need to be performed when assessing a video frame for the purposes of intra-frame encoding.

In this case, each other block of data elements that the cost measures determined for the sub-blocks of data elements when determining the cost measure for the initial block of data elements are used to determine a cost measure for can, and in an embodiment do, comprise any suitable and desired blocks of data elements that are within the initial, larger block of data elements, and which can be formed by appropriately combining the sub-blocks of data elements making up the initial larger block of data elements (for which respective cost measures have been determined).

Thus, in an embodiment the cost measures determined for (at least some of) the sub-blocks when determining a cost measure for the initial, larger block are also used to determine cost measure(s) for one or more, and in an embodiment for plural "intermediate" blocks of data elements (i.e. having a size in between the sub-blocks and the initial, larger block).

Thus, for example, when the sub-blocks have a size of 4×4 data elements (e.g. pixels), cost measure(s) determined for each 4×4 sub-block may also be used to determine cost measure(s) for, e.g., one or more 8×8, 16×16 and/or 32×32 intermediate blocks (e.g. in the case where the initial block is a 64×64 block), as is suitable and desired.

It would also be possible to use cost measures determined for sub-blocks from different initial blocks of data elements to determine a cost measure for intra-frame encoding another block of data elements of the frame of video image data where the sub-blocks from the plural different, initial blocks of data elements can be appropriately combined to form the another block of data elements, when desired.

While it would be possible in this regard to reuse the cost measures determined for the sub-blocks for the purpose of determining the cost measure for the initial block of data elements for also determining a cost measure for any intermediate block that is within the initial larger block of data elements, the Applicants have recognised that the cost measures determined for the sub-blocks when determining a cost measure for the initial (larger) block of data elements may only provide a suitable (and sufficiently accurate and reliable) cost measure for intra-frame encoding of a further block of data elements within the initial block of data elements (or otherwise) if that further block of data elements will use the same set of reference data values for its intra-frame encoding as would be used for the region of the initial (larger) block of data elements that corresponds to the further block of data elements for which the cost measure is being determined when (determining the cost measure for) performing the intra-frame encoding for the initial (larger) block of data elements.

For example, where the bottom row of an adjacent block of data elements has been used as the reference set of data elements for the initial (larger) block of data elements being encoded, then for an intermediate block of data elements within the initial (larger) block of data elements that is also contiguous with that bottom row of data elements in the adjacent block of data elements and that uses that bottom row of data elements to derive its reference set of data elements, then the cost measures determined for the corresponding sub-blocks of data elements using the data elements of the bottom row of the adjacent block of data elements to derive its reference set of data values can be used to determine the cost measure for the intermediate block of data elements (as it will have its reference set of data values in common with the initial (larger) block of data elements).

On the other hand, an intermediate block of data elements within the initial (larger) block of data elements that is spaced apart from the bottom row of the another block of data elements that has been used as the reference set of data elements for the initial (larger) block of data elements being encoded may in fact use a different set of data elements (e.g. from a block that is immediately above that intermediate block of data elements) to derive its reference set of data values. In that case therefore, the reference set of data values that would be used for intra-frame encoding that intermediate block of data elements will not be the same as (will not be in common with) the reference set of data values that was used for determining the cost measures for intra-frame encoding of the initial (larger) block of data elements, and so the cost measures determined for the corresponding sub-blocks for the initial (larger) block of data elements will have been determined using a different set of reference data values to the reference set of data values that would be used when intra-frame encoding that intermediate block of data elements.

Thus, in an embodiment, the cost measures determined for sub-blocks of data elements when determining the cost measure for the initial (larger) block of data elements are reused to determine cost measures for other blocks of data elements that are to be encoded using the same set of reference data values for those sub-blocks as were used when determining the cost measure for the initial (larger) block of data elements, but the cost measures determined for the sub-blocks of data elements when determining the cost measure for the initial (larger) block of data elements are not reused to also determine a cost measure for any further (intermediate) blocks of data elements that would not use the same set of reference data values for their intra-frame encoding as would be used when intra-frame encoding the initial (larger) block of data elements for which the sub-block cost measures have been determined.

In an embodiment, this is achieved by (only) using the cost measures determined for the sub-blocks of data elements when determining the cost measure for the initial (larger) block of data elements to also determine a cost measure for further block or blocks of data elements, when (if) the further block or blocks of data elements and the initial (larger) block of data elements have a common edge with (adjoining) the adjacent another block of data elements that is being used to derive the reference set of data values for the initial (larger) block of data elements that is being encoded.

In an embodiment, as well as determining and using a cost measure for a (larger) block of data elements and, potentially (and in an embodiment), e.g. for intermediate blocks of data elements within that larger block of data elements, for use when determining how to encode the video frame using intra-frame encoding, cost measures are also determined and used for the sub-blocks of data elements making up the larger block of data elements for the purposes of determining the encoding process to use. This may be appropriate where, for example, it is desired to determine whether to encode the block of data elements as a single larger block, or as its respective individual sub-blocks.

Thus, in an embodiment, as well as determining a measure of the cost of encoding the block of data elements to be encoded (using the determined cost measures for each of the sub-blocks of data elements making up the block of data elements), respective measures of the cost of encoding at least some, and in an embodiment plural, and in an embodiment each, of the sub-blocks of data elements making up the block of data elements individually when using data values of data elements of another block of data elements in the frame of video image data as a reference set of data values for the sub-block of data elements to be encoded are determined. In an embodiment this is done for each sub-block of data elements that the block of data elements has been divided into.

In this case, the cost measures determined for the sub-blocks when determining the cost measure for the overall, larger block of data elements are again, in an embodiment, also (re-)used as the cost measures for encoding the individual sub-blocks themselves (at least to the extent that it is possible and appropriate to do so).

The Applicants have again recognised in this regard that the cost measures determined for the sub-blocks when determining a cost measure for the initial (larger) block of data elements may only provide a suitable (and sufficiently accurate and reliable) cost measure for intra-frame encoding of a sub-block per se if that sub-block of data elements will use the same set of reference data values for its intra-frame encoding as would be used for the region of the initial (larger) block of data elements that corresponds to the sub-block of data elements for which the cost measure is being determined when (determining the cost measure for) performing the intra-frame encoding for the initial (larger) block of data elements.

Thus, in an embodiment, the cost measures determined for sub-blocks of data elements when determining the cost measure for the initial (larger) block of data elements are reused as cost measures for the sub-blocks of data elements themselves for those sub-blocks that are to be encoded using the same set of reference data values for those sub-blocks as were used when determining the cost measure for the initial (larger) block of data elements, but the cost measures determined for the sub-blocks of data elements when determining the cost measure for the initial (larger) block of data elements are not reused as cost measures for the sub-blocks themselves for any sub-blocks of data elements that would not use the same set of reference data values for their intra-frame encoding as would be used when intra-frame encoding the initial (larger) block of data elements for which the sub-block cost measures have been determined.

Again, in an embodiment, this is achieved by (only) using the cost measures determined for a sub-block of data elements when determining the cost measure for the initial (larger) block of data elements as a cost measure for the sub-block of data elements itself, when (if) the sub-blocks of data elements and the initial (larger) block of data elements have a common edge with (adjoining) the adjacent another block of data elements that is being used to derive the reference set of data values for the initial (larger) block of data elements that is being encoded.

Thus, in an embodiment, for at least some of the sub-blocks of data elements making up the block of data elements, the cost measure that is determined as the cost of encoding the sub-block when using data values of the data elements from the another block in the frame of video image data as a reference set of data values for encoding the (larger) block of data elements to be encoded is also used as the cost measure for the cost of encoding the sub-block of data elements, but for other sub-blocks of the set of sub-blocks of data elements making up the initial (larger) block of data elements, new (additional) measures of the cost of encoding those sub-blocks of data elements using the data values of data elements of another block of data elements in the frame of video image data as a reference set of data values for the sub-block of data elements are determined.

In other words, for some of the sub-blocks of data elements making up a larger block of data elements, the cost measures determined for the purpose of determining the cost of encoding the larger block of data elements are also used (are reused) as the cost measures for encoding the sub-blocks themselves (individually), but for other sub-blocks making up the block of data elements, new (additional) cost measures are determined. In the latter case therefore, a cost measure will be determined for the sub-block when encoding the sub-block as part of the larger block of data elements to be encoded, and a separate cost measure will be determined for encoding the sub-block per se (as a sub-block on its own).

In the case where a separate cost measure needs to be determined for encoding a sub-block individually, then that cost measure can be, and is n an embodiment, determined in any suitable and appropriate manner, such as, and in an embodiment, in one of the manners discussed above for determining the cost of encoding a sub-block as part of an initial, larger block of data elements. Thus, in an embodiment the sub-block cost measure is determined as an SAD or SATD value for the set of data elements making up the sub-block when performing intra-frame encoding using data values from another block or blocks as set of reference data values for the sub-block.

The respective cost measures for the sub-blocks (whether for when encoding the sub-block as part of a larger block of data elements to be encoded or as a sub-block per se), and for any intermediate blocks, can be determined in the technology described herein in any suitable and desired order. In an embodiment, respective cost measures for respective sub-blocks when encoding the sub-blocks as part of a larger block of data elements to be encoded are determined in turn, with the respective sub-block cost measures also being progressively accumulated for any suitable and desired intermediate blocks of data elements and for the overall larger block of data elements as the individual sub-block cost measures are determined. In an embodiment any further separate cost measures for encoding sub-blocks per se (as sub-blocks on their own) that are also needed are determined thereafter, e.g. once cost measures for encoding all of the sub-blocks as part of the larger data block of elements have been determined (and appropriately accumulated).

In an embodiment, the cost measures for the sub-blocks (at least when encoding the sub-blocks as part of a larger block of data elements to be encoded) are determined in a particular, e.g. selected, e.g. predefined, order, and in an embodiment in an order that will facilitate maximising the reuse of the determined sub-block cost measures for determining cost measures for other blocks of data elements, and/or that will minimise the number of different cost measure determination operations that need to be performed when deriving the necessary set of cost measures for the larger block of data elements and its constituent sub-blocks (and for any desired intermediate blocks to be considered).

Other arrangements would, of course, be possible.

As will be appreciated from the above, in embodiments at least, the technology described herein will, and in an embodiment does, involve and result in the determination of a number of different cost measures both for the cost of intra-frame encoding a given block of a video frame to be encoded, and for different positions and sizes, etc. of blocks of data elements of the video frame to be encoded. Thus there may be both cost measures determined for encoding the video frame using different arrangements (layouts) of blocks of data elements, and/or different cost measures determined for different ways of encoding a given block of data elements of the video frame.

Once a (suitable) set of cost measures have been determined, e.g. relating to the encoding of a single block of data elements of the video frame, and/or relating to the encoding of a given region or all of the video frame using plural different block arrangements, those cost measures can be, and are in an embodiment, used (e.g. compared) to select and determine how to encode the video frame using intra-frame encoding (e.g., and in an embodiment, in terms of both the block sizes and arrangement (layout) to use, and/or how each block itself should be encoded, etc.).

Thus, for example, when multiple cost measures have been determined for encoding a block of data elements of the video frame, e.g. in terms of the different prediction modes (e.g. projection directions) that may be used for encoding the block, and/or whether the block should be encoded as a single, larger block, or plural smaller intermediate blocks and/or sub-blocks, then in an embodiment those different cost measures are compared so as to select and determine how to encode the block of data elements.

Accordingly, in an embodiment, the technology described herein comprises, for a block to be encoded, comparing the determined cost measure for encoding the block as a whole, and determined cost measures for encoding each of the sub-blocks of the block as separate sub-blocks, and then selecting the encoding arrangement to use for the block of data elements accordingly.

In an embodiment the mode of encoding (e.g. encoding the block at the level of the block to be encoded or encoding the block as individual sub-blocks, and/or as plural intermediate blocks, and/or using a particular projection direction) having the lowest cost measure is chosen for encoding the block.

In these arrangements, the cost measures and assessment could also take account of other factors, such as some form of "overhead" cost measure that represents the additional "cost" that would be incurred when encoding a given block of data elements as plural smaller blocks, rather than as a single block as a whole, when desired.

Other arrangements would, of course, be possible.

Once an encoding mode (operation) (e.g. block layout, etc.) has been selected based on the cost measures, then the relevant region (e.g. block) of the video frame to be encoded should be, and in an embodiment is, encoded according to the selected encoding arrangement. Thus, in an embodiment the technology described herein further comprises encoding a (and the) block of data elements of the video frame to be encoded using an encoding mode (arrangement) that has been selected based on, and using, the determined cost measure or measures for the block(s) of data elements.

In an embodiment the method of the technology described herein is repeated for each of plural blocks for a frame of video image data to be encoded in, such that the entire frame may be encoded. Similarly, in an embodiment the process is repeated for each frame in a sequence of frames of video image data, e.g. when the sequence of frames is to be encoded using an intra-frame mode of encoding.

Such a sequence of frames of video image data that is provided and encoded in the technology described herein can be any suitable and desired sequence of video frames. There will be at least two frames in the sequence of video frames, but in an embodiment there are more than two frames in the sequence of video frames.

In any of the embodiments described herein, generating a set of intra-frame cost measures for a block in a frame of video image data to use when encoding the block may be followed by performing an encoding process that encodes the block of video image data in accordance with the generated set of intra-frame cost measures and, e.g., encoding predictions. Thus in an embodiment the generated set of intra-frame cost measures and/or encoding predictions are provided to (and in an embodiment the apparatus comprises) encoding circuitry, for use to encode the video image data for the current block and, e.g., frame.

The encoding circuitry may compare the cost measures to select a suitable and desired way (e.g. mode or modes) to encode the block. Thus in an embodiment the encoding circuitry is configured to perform an encoding process that encodes the block of video image data in accordance with the selected mode or modes of encoding.

The encoding process can take any desired and suitable form. In an embodiment the encoding process is defined by the standard (e.g. HEVC, H264, VP8 or VP9) to be used when encoding the block of video image data.

As will be appreciated, any of the processes that are performed in respect of a block to be encoded that corresponds to a region of the frame of video image data may be, and in an embodiment is, performed respectively for each (e.g. every) one of plural blocks into which the frame of video image data is divided for encoding purposes.

As will also be appreciated, any of the processes that are performed in respect of a frame of video image data may, in practice, be performed respectively for each (e.g. every) one of plural frames of a sequence of frames. However, it should be noted that in differential video encoding standards such as HEVC, H264, VP8 and VP9, frames of video image data in a sequence of frames may be encoded as "inter" frames, when they are encoded relative to other frame(s) in the sequence of frames, or they may be encoded as "intra" frames, e.g. in the manner of the technology described herein.

In any of the embodiments described herein, once encoded, the encoded block(s), and/or encoded frame, and/or encoded sequence of frames may be used in any desired and suitable way. For example, the encoded block(s) and/or frame and/or encoded sequence of frames may be output, e.g. stored in memory and/or streamed to another device. Thus, the apparatus may comprise output circuitry (e.g. write out circuitry) configured to output (e.g. write out) the encoded block(s) and/or encoded frame and/or encoded sequence of frames, e.g. to memory or to another device.

The encoded block(s) and/or encoded frame and/or encoded sequence of frames may later be retrieved and/or received, e.g. for decoding. Thus, the apparatus may comprise input circuitry (e.g. read in circuitry) configured to input (e.g. read in) the encoded block(s) and/or encoded frame and/or encoded sequence of frames, e.g. from memory.

Encoding a block may be followed by a decoding process that decodes the encoded block. Thus, the apparatus and/or system may comprise decoding circuitry configured to perform a decoding process that decodes an encoded block (and frame). The decoding process can take any desired and suitable form, for example that corresponds to the encoding process that was used when encoding the encoded block (and frame). The decoding process may be defined by the standard (e.g. HEVC, H264, VP8 or VP9) that was used when encoding the frame of video image data.

In any of the embodiments described herein, once determined, the data elements of the decoded block (and frame) may be used in any desired and suitable way.

For example, the data elements of the decoded block (and frame) may be output (e.g. by an output (e.g. display) processor), e.g. for display. In these embodiments, the arrays of data elements may correspond to images, e.g. frames of image data, and the data elements may correspond to a pixel or pixels.

As will be appreciated, any of the processes that are performed in respect of an encoded block (or sub-block) of an encoded array may, in practice, be performed respectively for each (e.g. every) one of plural encoded blocks (or sub-blocks) of the encoded array.

As will also be appreciated, any of the processes that are performed in respect of an encoded frame of an encoded sequence of frames may, in practice, be performed respectively for each (e.g. every) one of plural encoded frames of the encoded sequence of frames.

The processes described herein in any embodiment may be performed by any desired and suitable apparatus. For example, the processes described herein in any embodiment may be performed by a video processor (codec). The apparatus described herein in any embodiment may therefore comprise or may be a video processor. Thus, the processing circuitry, encoding circuitry, decoding circuitry, output circuitry or write out circuitry, input circuitry or read in circuitry, etc. described herein in any embodiment may form part of a video processor. The apparatus described herein in any embodiment may comprise, or may be, or may form part of, a system on chip (SoC).

The memory referred to herein may be any desired and suitable memory of or for the apparatus. The memory may be external to the apparatus, e.g. video processor and/or system on chip (SoC). The memory may be, for example, main system memory.

The technology described herein can be used for all forms of data arrays that a data processing apparatus may provide and/or use, such as images or frames for display. Thus, as indicated above, the arrays of data elements may comprise image data and/or may correspond to images or frames of image data.

In an embodiment, the various functions of the technology described herein are carried out on a single data (e.g. image) processing platform that provides and/or uses the frames of data elements.

As will be appreciated by those skilled in the art, the apparatus of the technology described herein may be part of an overall data processing system that includes, for example, a host (e.g. central) processor. The host processor may, for example, execute applications that require data processing by the apparatus. The host processor may send appropriate commands and data to the apparatus to control it to perform the data processing operations and to generate and/or use an output required by applications executing on the host processor. To facilitate this, the host processor may execute a driver for the apparatus and/or may execute a compiler or compilers for compiling programs to be executed by a programmable execution unit of the apparatus.

In embodiments, the apparatus or system may comprise, and/or may be in communication with, one or more memories and/or memory devices that store the data described herein, and/or store software for performing the processes described herein. The apparatus or system may comprise, and/or may be in communication with a host microprocessors, and/or display for displaying images based on the data elements of the frames, or a video processor for processing the data described above. The apparatus or system may comprise, and/or may be in communication with a video camera that generates the frames of video image data.

The technology described herein can be implemented in any suitable system, such as a suitably configured computer or micro-processor based system. In an embodiment, the technology described herein is implemented in a computer and/or micro-processor based system. In an embodiment, the technology described herein is implemented in (or as) a video decoder, encoder and/or processor.

The system can include any suitable and desired components or elements to allow the operation in the manner of the technology described herein, such as, for example, a rendering unit (to which the output (decoded) video image data is provided, e.g. from the decoding processing circuitry) for rendering, an output, e.g. a display, to which the rendered frames of video are provided from the rendering unit, and memory for storing the data that is required (such as the unencoded video data, the consequent encoded data blocks and the consequent output (decoded) video data).

The various functions of the technology described herein may be carried out in any desired and suitable manner. For example, the steps and functions of the technology described herein can be implemented in hardware or software, as desired. Thus, for example, unless otherwise indicated, the various circuitry, functional elements, stages, and "means" of the technology described herein may comprise a suitable processor or processors, controller or controllers, functional units, circuitry, processing logic, microprocessor arrangements, etc., that are operable to perform the various steps or functions, etc., such as appropriately dedicated hardware elements (processing circuitry) and/or programmable hardware elements (processing circuitry) that can be programmed to operate in the desired manner.

The various steps or functions, etc., of the technology described herein may be duplicated and/or carried out in parallel on a given processor. Equally, the various processing stages may share processing circuitry, etc., when desired.

Subject to any hardware necessary to carry out the specific steps or functions, etc., discussed above, the apparatus and/or system can otherwise include any one or more or all of the usual functional units, etc., that apparatus and/or systems (e.g. video encoders, decoders, and processors) include.

The various data processing stages (e.g. processing circuitry) can accordingly be implemented as desired and in any suitable manner, and can perform any desired and suitable functions, respectively. Similarly, the various data can be defined and stored in any suitable and desired manner.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software, e.g. computer programs. Thus, further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein also extends to a computer software carrier comprising such software which when used to operate an apparatus or system comprising a data processor causes in conjunction with said data processor, said apparatus or system to carry out the steps of the methods of the technology described herein. Such a computer software carrier could be a physical storage medium such as a ROM chip, CD ROM, RAM, flash memory, or disk.

It will further be appreciated that not all steps of the methods of the technology described herein need be carried out by computer software and thus in further embodiments comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable storage medium, for example, diskette, CD, DVD, ROM, RAM, flash memory, or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

Embodiments of the technology described herein will now be described in the context of encoding video image data, e.g. according to an encoding format such as HEVC, H264, VP8 or VP9.

The drawings show elements of a video data processing apparatus and system that are relevant to embodiments of the technology described herein. As will be appreciated by those skilled in the art there may be other elements of the video data processing apparatus and system that are not illustrated in the drawings. It should also be noted here that the drawings are only schematic, and that, for example, in practice the shown elements may share significant hardware circuits, even though they are shown schematically as separate elements in the drawings.

FIG. 1 shows an exemplary data processing system 1 that may encode video image data according to an embodiment of the technology described herein. Thus the system 1 can provide frames of video image data for display that have been encoded in the manner of the technology described herein.

In this embodiment, the system 1 comprises a video data processing apparatus in the form of a system on chip (SoC) 2. The system 1 also comprises off-chip (main) memory 16, a display device 18 and a video camera 20, e.g. that generates the video image data for encoding.

The SoC 2 comprises a central processing unit (CPU) 4, a graphics processing unit (GPU) 6, a video processor 8, a display controller 10, an interconnect 12 and a memory controller 14.

As is shown in FIG. 1, the CPU 4, GPU 6, video processor 8 and display controller 10 communicate with each other via the interconnect 12 and with the memory 16 via the interconnect 12 and memory controller 14. The display controller 10 also communicates with the display device 18. The video camera 20 also communicates with the SoC 22 via the interconnect 12.

In the following embodiments, the video processor 8 reads in image data from memory 16, encodes the image data, and then outputs that encoded image data, e.g. for storage in memory 16 or for streaming to another device. The encoded image data can later be retrieved and decoded, e.g. by the video processor 8, or received and decoded by another device. The decoded image data can then be output, e.g. by the display controller 10 to the display device 18 or by another device, for display.

The video image data is typically generated, e.g. by the video camera 20, as a sequence of frames of video image data. Video encoding formats can enable a significant reduction in the file size of the video image data for transmission (which thus aids the efficient streaming of the video image data) without a significant visible loss of image quality when the video images are viewed.

Two main schemes for encoding frames of video image data may be used. In both of these schemes, a frame of video image data may be divided into smaller "blocks" of data elements and encoded on a block by block basis based on the difference between blocks of data elements.

First, in a sequence of frames of video image data, a particular frame may be encoded relative to another (e.g. previous) frame, e.g. to exploit temporal redundancies between (e.g. corresponding blocks in the) frames in the sequence. Such encoding is known as "inter-frame" encoding.

Second, blocks of data within a particular frame of video image data may be encoded relative to other blocks of data in the same frame, e.g. to exploit spatial redundancies between the blocks of data in the frame. Such encoding is known as "intra-frame" encoding. The present embodiment is concerned primarily with this latter form of encoding.

Intra-frame encoding is typically performed by encoding the pixels in a block of a frame relative to the (e.g. already encoded) pixels at the edge of a neighbouring block, e.g. by determining the differences ("residuals") between the data represented at the pixels in the block being encoded and the pixels at the edge of the neighbouring block. Different neighbouring edges (e.g. to the left or above the block being encoded) may be used for performing the encoding and the pixels of these neighbouring edges may be projected into the block being encoded in different directions (e.g. vertically, horizontally or diagonally, where possible).

In order to encode a block in a "cost effective" manner, a measure of the cost of encoding a block in a number of different ways, e.g. using different neighbouring edges and different directions for projecting the pixels from these neighbouring edges into the block being encoded, is determined, and these cost measures are then compared to determine the most cost effective way of encoding the block of pixels (i.e. corresponding to the way in which the chosen cost measure was determined).

Figure 2:
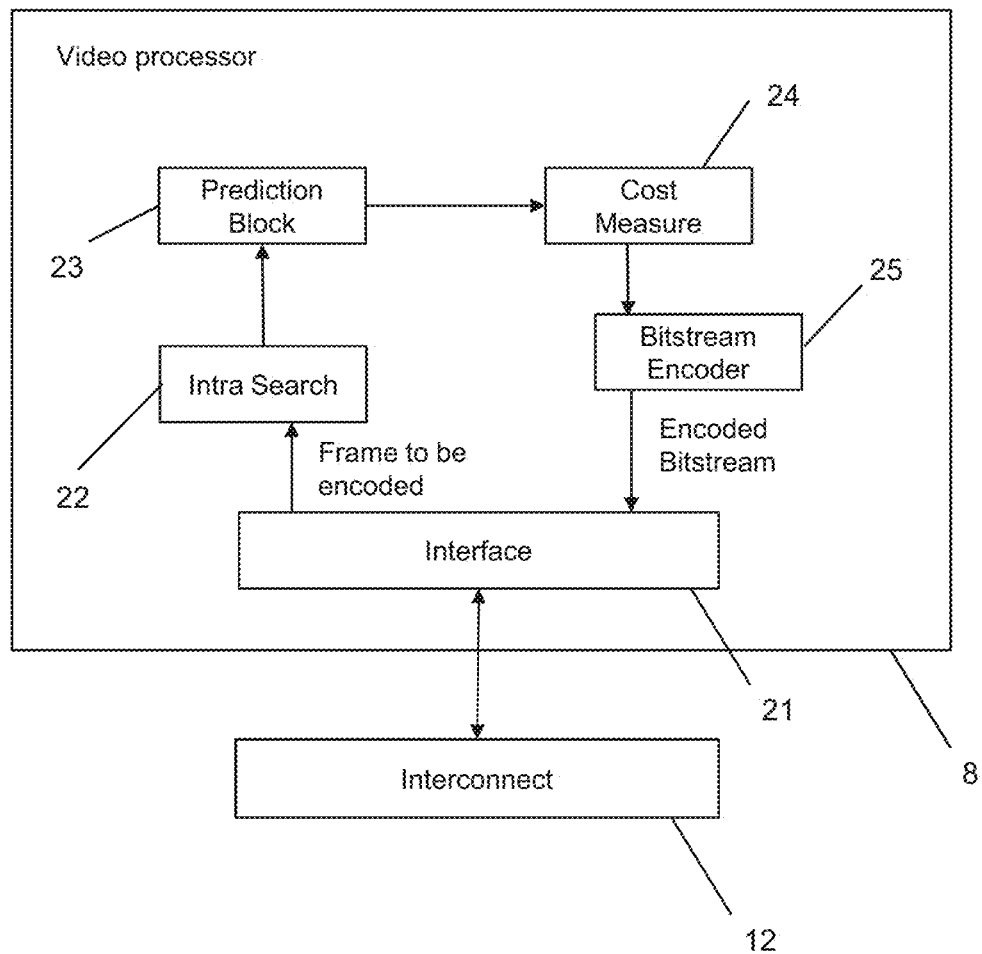
FIG. 2 shows schematically a video processing unit according to an embodiment of the technology described herein.

FIG. 2 shows further details of a video processor 8 that can be used to determine such cost measures (and then subsequently encode a block in a frame of video image data) in the manner of the present embodiment.

In this embodiment the video processor 8 comprises an interface 21 that can provide, via the interconnect 12, a current frame to be encoded. The frame to be encoded is divided into plural blocks (e.g. 64×64 data elements (pixels) in size) to be encoded on a block by block basis. Each block can be further divided into multiple different sub-blocks, e.g. of 4×4 pixels in size. Any appropriately sized intermediate block, e.g. of 16×16 pixels, may also be formed for the purposes of encoding each block in the frame. Other block sizes could of course be used as desired.

In this embodiment, a block of a video frame is encoded using another block within the video frame itself, i.e. using "intra" mode encoding. The video processor 8 accordingly comprises intra search circuitry 22 that, for a given block in the frame, searches within the frame itself for one or more suitable candidate other blocks to consider using when encoding that given block.

The video processor also comprises prediction block circuitry 23 that, for the each of the other block(s) in the frame found by the intra search circuitry 22, generates one or more prediction blocks by projecting the data elements at the perimeter of the other block(s) into the block to be encoded. This prediction block can then be used by cost measure circuitry 24 to determine a cost measure for each prediction block.

A cost measure is, in an embodiment of the technology described herein, determined by calculating the residuals (differences) between the (data values of the) data elements of the block to be encoded and the (data values of the) respective data elements of the prediction block, and combining these residuals using any suitable metric that indicates the similarity or difference between the block to be encoded and the prediction block in question, such as a sum of absolute differences (SAD) value or a sum of absolute transformed differences (SATD) value. As will be explained below, such cost measures may be determined for multiple different prediction blocks and/or for multiple different sizes of blocks into which a frame of video image data can be divided.

The video processor also comprises a bitstream encoder 25 that evaluates the cost measures that have been determined to choose the most cost effective prediction (and thus encoding) mode for encoding the block to be encoded in the frame of video image data. The bitstream encoder 25 then encodes the block to be encoded according to the encoding mode corresponding to the chosen prediction mode. The bitstream encoder 25 can use any suitable and desired encoding scheme.

An example of this operation will now be explained with reference to FIG. 3.

Figure 3:
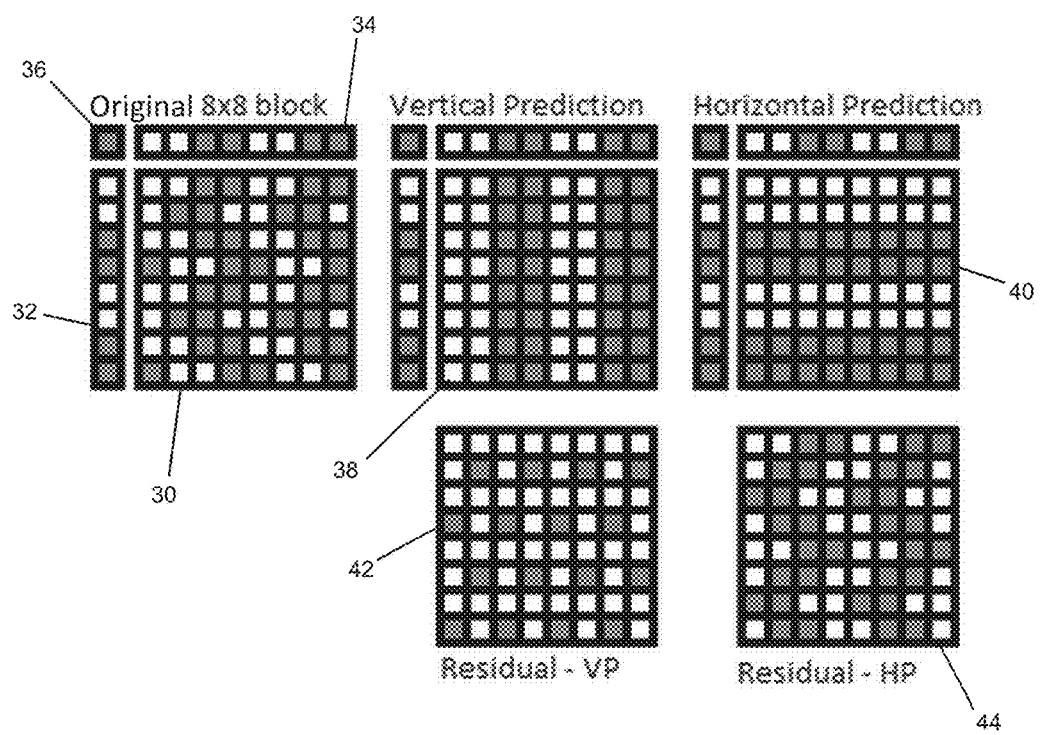
FIG. 3 shows schematically how intra-frame prediction may be used for a block in a frame of video image data.

FIG. 3 shows schematically how such intra-frame prediction may be used for an 8×8 data element (pixel) block 30 in a frame of video image data. For the purposes of clarity only two pixels colours are shown (i.e. clear or shaded) in FIG. 3, but it will be appreciated that in general the pixels of a block in a frame of video image data can take a range of data (e.g. colour) values.

FIG. 3 also shows the eight pixels 32 from the neighbouring block to the left of the block 30 being encoded, the eight pixels 34 from the neighbouring block above the block 30 being encoded, as well as the pixel 36 from the diagonally adjacent block (i.e. above and to the left of the block 30 being encoded). These pixels 32, 34, 36 are from neighbouring, contiguous blocks that have already been encoded.

The pixels 32, 34 from these neighbouring blocks are then, respectively, projected vertically and horizontally into the block 30 being encoded to generate a predicted version for the block 30. After the pixels 32, 34 have been projected into the block 30 both vertically 38 and horizontally 40, the residuals (differences) 42, 44 between the pixels in the projected blocks 38, 40 and the pixels in the block 30 being encoded are calculated. In the residual blocks 42, 44, the pixels for which the respective prediction blocks 38, 40 have the same data values as the respective pixels in the original block 30 being encoded are represented schematically by a clear pixel, and the pixels for which the respective prediction blocks 38, 40 have different data values from the respective pixels in the original block 30 being encoded are represented schematically by a shaded pixel.

The total encoding cost measure for a prediction block may be determined in any suitable and desired way. In the present embodiment, a sum of absolute differences (SAD) of the residual values in each of the blocks 38, 40 is used. For the residual blocks 38, 40 shown in FIG. 3, assigning clear pixels a value of 0 and shaded pixels a value of 1, the SAD for the vertical prediction residual block 38 is 16 and the SAD for the horizontal prediction residual block 40 is 32. Therefore, for these two different encoding predictions, the vertical prediction gives the lowest cost (using SAD) for encoding the block 30. The block 30 may then be encoded using this vertical prediction mode.

It will be appreciated that directions in which to project the pixels 32, 34, 36 from the neighbouring blocks of the frame other than vertical and horizontal may also be used, e.g. diagonal projections may be used (which may require the use of the pixels 32, 34 from both the neighbouring blocks used previously, as well as the pixel 36 in the neighbouring block at the top left hand corner of the block 30 being encoded).

It will also be appreciated that for a given block to be encoded, the predictions able to be generated may depend on the position of the block in the frame, e.g. relative to previously encoded blocks.

The present embodiment relates to the determination of the cost measure for a given block of a video frame to be encoded using intra-frame encoding, as discussed above. However, in the present embodiment (and in accordance with the technology described herein), the cost measure for intra-frame encoding a given block of data elements (pixels) of a video frame is determined by determining respective cost measures for each of plural sub-blocks making up the block to be encoded, and then using those sub-block cost measures to determine a cost measure for the overall block to be encoded.

Figure 5:
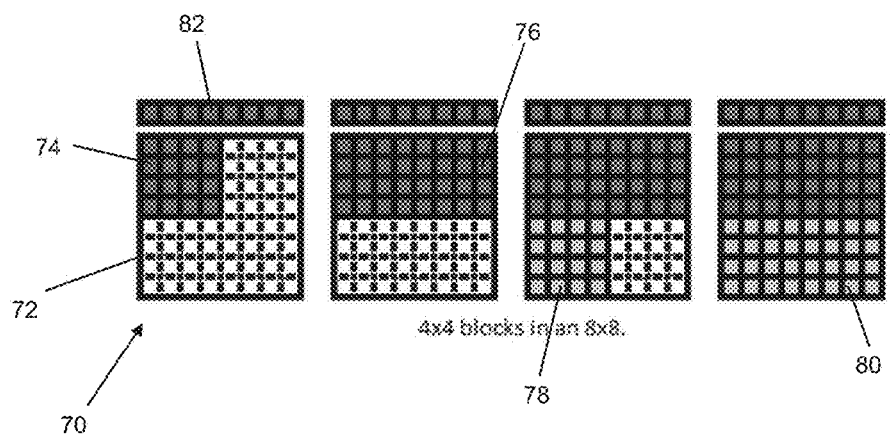
FIG. 5 shows how cost measures for encoding predictions may be determined for blocks of different sizes in a frame of video image data in an embodiment of the technology described herein.

FIG. 5 illustrates this, and shows an exemplary block 72 of 8×8 pixels to be encoded using a vertical mode of projecting the pixels 82 from a neighbouring block above the block 72, being subdivided into four 4×4 pixel sub-blocks 74, 76, 78 and 80. As will be discussed further below, in the present embodiments an encoding cost measure (such as an SAD value as discussed above) is determined separately for each of the smaller sub-blocks 74, 76, 78 and 80 (using as the reference, prediction set of data values for the sub-block the corresponding vertically projected pixels 82 from the neighbouring block above the block 72 being encoded). The individual cost measures for the sub-blocks 74, 76, 78 and 80 are then summed (totalled) to provide an overall cost measure for encoding the block 72 of 8×8 pixels using the vertical mode of projecting pixels 82 from the neighbouring block above the block 72.

Furthermore, and as will be discussed further below, as well as using the cost measures determined for the individual sub-blocks 74, 76, 78, 80 to determine a cost measure for encoding the overall block 72, the cost measures determined for the individual sub-blocks may also be used as cost measures for the purpose of evaluating the encoding of some of the sub-blocks as individual sub-blocks using a vertical mode of projection from the neighbouring block above the block 72, and, also, to derive a cost measure for encoding an intermediate block of pixels that falls within the overall larger block 72.

In particular, where the set of predicted, reference, pixels (pixel values) used for encoding the overall block 72 would also be used when encoding a sub-block or an intermediate block within that initial, larger block 72, then the cost measures of the sub-blocks determined for the purposes of determining the cost measure for encoding the overall larger, initial block 72, can also be used as cost measures for assessing the encoding of the sub-block or intermediate block when using that encoding operation.

Figure 4A:
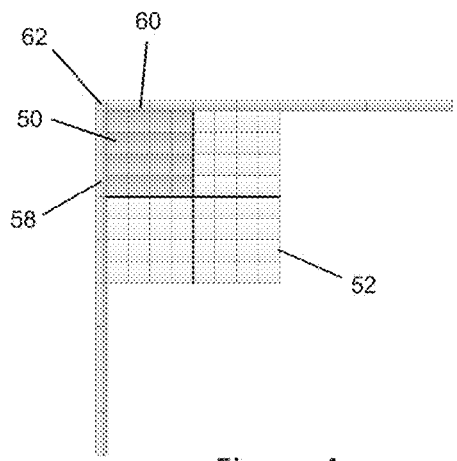
FIGS. 4a, 4b and 4c show schematically how different prediction modes are available for different blocks within a frame of video image data in an embodiment of the technology described herein.
Figure 4B:
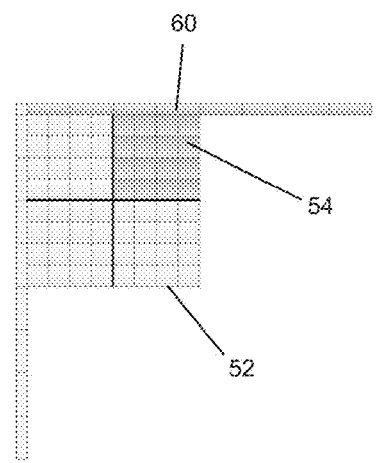
Figure 4C:
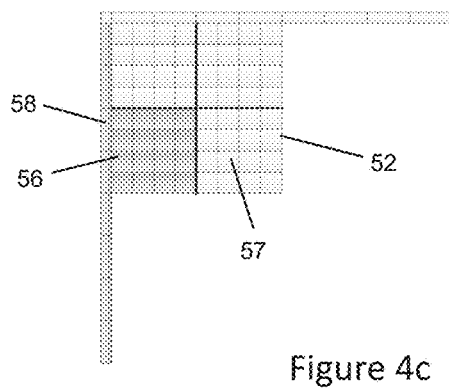

FIGS. 4a, 4b, and 4c illustrate this, and show an exemplary 8×8 pixel block 52 that is subdivided into four 4×4 sub-blocks 50, 54, 56 and 57, and how the cost measures determined for those sub-blocks for the purpose of determining cost measure for the overall 8×8 block 52 can also be reused as corresponding cost measures for encoding the individual sub-blocks per se.

FIGS. 4a, 4b and 4c show that the 8×8 block 52 has previously encoded pixels 58, 60, 62 in the adjoining blocks to the left, above and diagonally respectively available to use for determining respective prediction and cost measures for the 8×8 block 52. Therefore prediction blocks generated by projecting the pixels 58, 60, 62 in the adjoining blocks in the horizontal, vertical and diagonal directions respectively are able to be calculated for the 8×8 block 52, which may be used to determine respective cost measures for use in encoding the 8×8 block 52 as an 8×8 block.

As can be seen from FIG. 4a, if the 4×4 sub-block 50 at the top left-hand corner of the 8×8 block 52 was to be encoded as a 4×4 sub-block per se, then the encoding of that sub-block 50 would use the same previously encoded pixels 58, 60, 62 in the adjoining blocks to the left, above and diagonally for determining its respective prediction block (and thus cost measure), as would be used for that region of the 8×8 block 52 when encoding the 8×8 block 52 as an 8×8 block.

Therefore, a cost measure determined for the sub-block 50 when determining the overall cost measure for the 8×8 block 52 using any of vertical, horizontal or diagonal prediction can also be used as a cost measure for correspondingly encoding the 4×4 sub-block 50 as that 4×4 sub-block 50 (i.e. not simply as part of the larger 8×8 block 52).

In other words, because the same pixels 58, 60, 62 in the adjoining blocks will be used to generate the reference set of values for the 4×4 sub-block 50 when considering intra-frame encoding that 4×4 sub-block 50 on its own, as would be used for the reference set of data values for that 4×4 sub-block 50 when intra-frame encoding that 4×4 sub-block 50 as part of the 8×8 block 52 (in a given manner), the cost measure determined for encoding the 4×4 sub-block 50 as part of the 8×8 block 52 (in a given manner) will be the same as (and therefore can be reused for) the cost measure that would be determined for encoding the 4×4 sub-block 50 as a 4×4 pixel block per se (in the corresponding manner).

Thus, the cost measure(s) determined for the 4×4 sub-block 50 when encoding the 4×4 sub-block 50 as part of the 8×8 block 52 may also be used as cost measure(s) for encoding the 4×4 sub-block 50 in a differently sized overall block (e.g. as the 4×4 sub-block 50 per se), which avoids having to determine such cost measures twice.

FIG. 4b illustrates the corresponding situation for the 4×4 sub-block 54 at the top right hand corner of the 8×8 block 52.

As shown in FIG. 4b, when it comes to determining cost measures for encoding the 4×4 sub-block 54 as part of the 8×8 block 52, prediction blocks generated by projecting the pixels 58, 60, 62 in the adjoining blocks in horizontal, vertical and diagonal directions can all be used to determine respective cost measures because the 8×8 block 52 as a whole is contiguous with these adjoining blocks, even when the 4×4 sub-block 54 per se is not.

However, can be seen from FIG. 4b, if the 4×4 sub-block 54 at the top right-hand corner of the 8×8 block 52 was to be encoded as a 4×4 sub-block per se, then the encoding of that sub-block 54 would only use the same previously encoded pixels in an adjoining block as would be used for that region of the 8×8 block 52 when encoding the 8×8 block 52 as an 8×8 block, when using prediction blocks generated by projecting the pixels 60 in the vertically adjoining block in vertical and diagonal directions (but not in the horizontal direction because the 4×4 sub-block 54 is not contiguous with the pixels 58 from the block to the left).

Therefore, a cost measure determined for the sub-block 54 when determining the overall cost measure for the 8×8 block 52 using any vertical, or diagonal prediction can also be used as a cost measure for correspondingly encoding the 4×4 sub-block 54 as that 4×4 sub-block 54 (i.e. not simply as part of the larger 8×8 block 52).

In other words, because the same pixels 60 in the vertically adjoining block will be used to generate the reference set of values for the 4×4 sub-block 54 when considering intra-frame encoding that 4×4 sub-block 54 on its own using vertical or diagonal prediction, as would be used for the reference set of data values for that 4×4 sub-block 54 when intra-frame encoding that 4×4 sub-block 54 as part of the 8×8 block 52 using vertical or diagonal prediction, the cost measures determined for encoding the 4×4 sub-block 54 as part of the 8×8 block 52 using vertical or diagonal prediction will be the same as (and therefore can be reused for) the cost measures that would be determined for encoding the 4×4 sub-block 54 as a 4×4 pixel blockper se using vertical or diagonal prediction.

On the other hand, a cost measure determined for the sub-block 54 when determining the overall cost measure for the 8×8 block 52 using horizontal prediction (using the pixels 58 in the adjacent block) will not also be used as a cost measure for correspondingly encoding the 4×4 sub-block 54 as that 4×4 sub-block 54 per se (i.e. not simply as part of the larger 8×8 block 52) using horizontal prediction, but rather a separate horizontal prediction cost measure for the sub-block 54 (e.g. using pixels in the sub-block 50 as a reference) would be determined.

FIG. 4c illustrates the corresponding situation for the 4×4 sub-block 56 at the bottom left hand corner of the 8×8 block 52.

As shown in FIG. 4c, when it comes to determining cost measures for encoding the 4×4 sub-block 56 as part of the 8×8 block 52, prediction blocks generated by projecting the pixels 58, 60, 62 in the adjoining blocks in horizontal, vertical and diagonal directions can all be used to determine respective cost measures because the 8×8 block 52 as a whole is contiguous with these adjoining blocks, even when the 4×4 sub-block 56 per se is not.

However, can be seen from FIG. 4c, if the 4×4 sub-block 56 at the bottom left-hand corner of the 8×8 block 52 was to be encoded as a 4×4 sub-block per se, then the encoding of that sub-block 56 would only use the same previously encoded pixels in an adjoining block as would be used for that region of the 8×8 block 52 when encoding the 8×8 block 52 as an 8×8 block, when using prediction blocks generated by projecting the pixels 58 in the horizontally adjoining block in horizontal and diagonal directions (but not in the vertical direction because the 4×4 sub-block 56 is not contiguous with the pixels 60 from the block above).

Therefore, a cost measure determined for the sub-block 56 when determining the overall cost measure for the 8×8 block 52 using any horizontal or diagonal prediction can also be used as a cost measure for correspondingly encoding the 4×4 sub-block 56 as that 4×4 sub-block 54 (i.e. not simply as part of the larger 8×8 block 52).

In other words, because the same pixels 58 in the horizontally adjoining block will be used to generate the reference set of values for the 4×4 sub-block 56 when considering intra-frame encoding that 4×4 sub-block 56 on its own using horizontal or diagonal prediction, as would be used for the reference set of data values for that 4×4 sub-block 56 when intra-frame encoding that 4×4 sub-block 56 as part of the 8×8 block 52 using horizontal or diagonal prediction, the cost measures determined for encoding the 4×4 sub-block 56 as part of the 8×8 block 52 using horizontal or diagonal prediction will be the same as (and therefore can be reused for) the cost measures that would be determined for encoding the 4×4 sub-block 54 as a 4×4 pixel block per se using horizontal or diagonal prediction.

On the other hand, a cost measure determined for the sub-block 56 when determining the overall cost measure for the 8×8 block 52 using vertical prediction (using the pixels 60 in the vertically adjacent block) will not also be used as a cost measure for correspondingly encoding the 4×4 sub-block 56 as that 4×4 sub-block 56 per se (i.e. not simply as part of the larger 8×8 block 52) using vertical prediction, but rather a separate vertical prediction cost measure for the sub-block 56 (e.g. using pixels in the sub-block 50 as a reference) would be determined.

As the 4×4 sub-block 57 in the bottom right-hand corner of the 8×8 block 52 is not contiguous with any of the pixels 58, 60, 62 in the adjoining blocks that may be used for intra-frame encoding the 8×8 block 52, no cost measures determined for encoding the 4×4 sub-block 57 as part of the 8×8 block 52 will also be used as a cost measure for encoding the 4×4 sub-block 57 on its own (not as part of the 8×8 block 52). Instead, separate cost measures will be determined for encoding the 4×4 sub-block 57 on its own.

An embodiment of determining respective cost measures for sub-blocks of a block of data elements of a video frame to be encoded and for using the cost measures determined for the sub-blocks both as cost measures for the sub-blocks per se (where it is appropriate to do that) and for the overall data block being considered (and for intermediate data blocks that are smaller than and within that data block being considered) will now be described with reference to FIG. 6, which shows a flowchart of this operation, and with reference to the determination of cost measures for encoding the 8×8 block of data elements 72 shown in FIG. 5.

(It will be appreciated that in general a frame of video image data will be larger than 8×8 pixels; however, for the purposes of simplicity and clarity, a block having 8×8 pixels containing sub-blocks of 4×4 pixels is sufficient to describe the operation of an embodiment of the technology described herein. Other, e.g. 8×8, blocks in the frame will be processed in a similar manner.)

Figure 6:
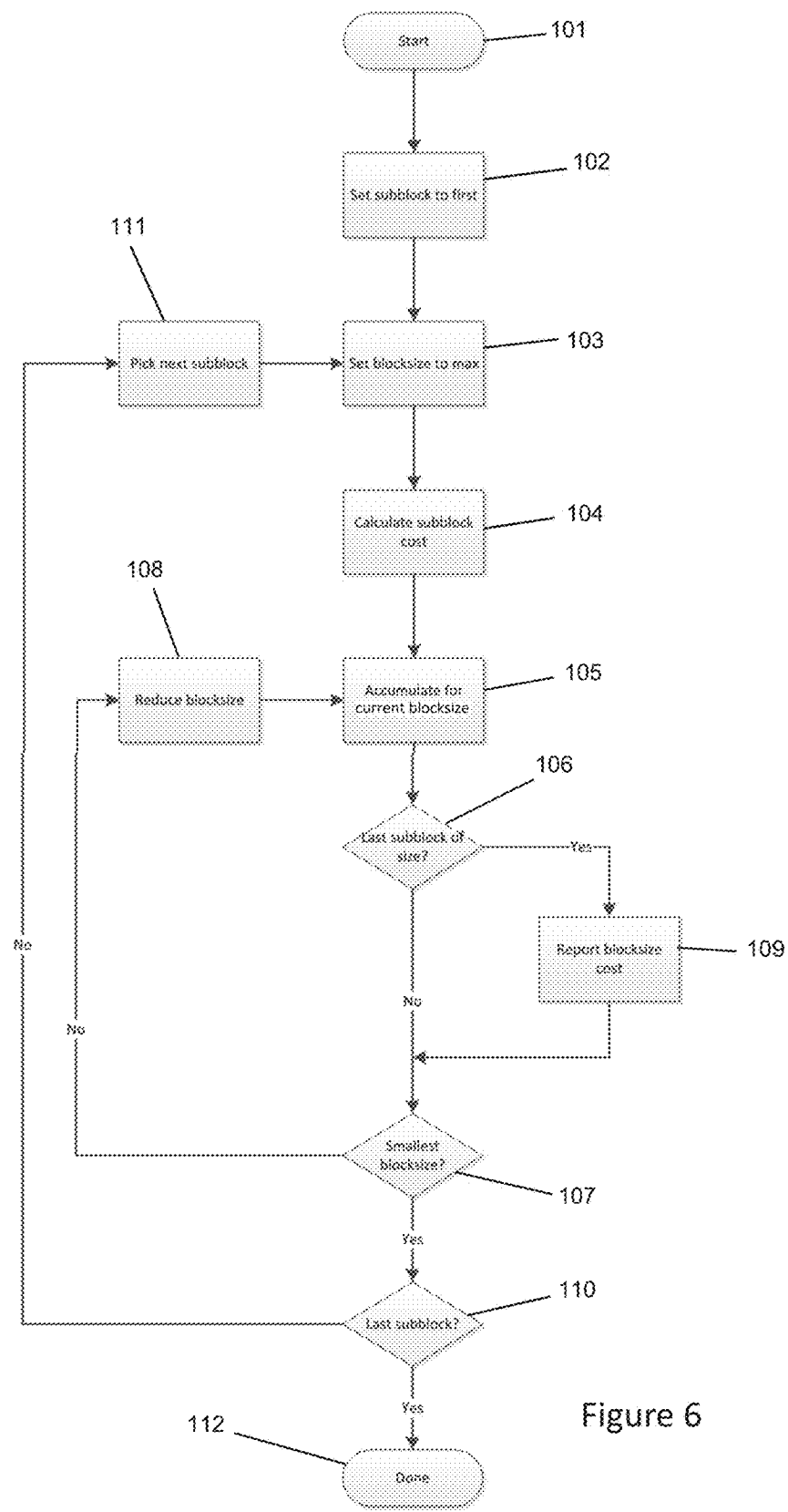
FIG. 6 is a flow chart of the operation of a system according to an embodiment of the technology described herein.

FIG. 6 is a flow chart of the operation of a video data processing system (e.g. such as that shown in FIG. 1 and, e.g., using the video processor shown in FIG. 2) in this embodiment of the technology described herein.

When a block 72 of a frame of video image data 70 is to be encoded using an intra-frame mode of encoding, in this embodiment of the technology described herein, the operation starts (step 101, FIG. 6) by setting the sub-block, for which an encoding cost measure is to be determined first, to be the 4×4 sub-block 74 in the top left hand corner of the 8×8 block 72 of the frame 70 (step 102, FIG. 6). This 4×4 sub-block 74 is denoted as the (0,0) sub-block (i.e. owing to its position in the 8×8 block 72).

The block size over which the encoding cost measures are to be determined is set to the maximum (i.e. 8×8) for the block 72 being encoded (step 103, FIG. 6) and a cost measure for each of the encoding prediction directions available for the 4×4 (0,0) sub-block 74 is calculated (step 104, FIG. 6). (As will be seen from FIG. 5, only the pixels 82 from the block above the block 72 being encoded are available for generating the cost measures and thus only vertical predictions may be available. However, as can be seen from FIGS. 4a, 4b and 4c, when more previously encoded neighbouring blocks are available more modes (i.e. projection directions) are available for calculating the cost measures.)

The cost measures for the predictions calculated are then written out to the memory 16 so they may be accumulated for the 8×8 block 72 (step 105, FIG. 6).

The system then determines if the 4×4 (0,0) sub-block 74 for which the cost measure has just been calculated is the last 4×4 sub-block in the 8×8 block 72 (step 106, FIG. 6). As it is not (i.e. there are three further 4×4 sub-blocks 76, 78, 80 in the 8×8 block 72), the "no" branch of the flow chart is followed and the system determines if the 8×8 block 72 is the smallest block size for which the cost measures are to be determined (step 107, FIG. 6). As the 8×8 block size is not the smallest block size (i.e. the 4×4 block size is smaller), the "no" branch of the flow chart is followed and the block size (i.e. that was set in step 103 to 8×8) is reduced to 4×4 (step

108, FIG. 6), so to allow the cost measures calculated for the 4×4 (0,0) sub-block 74 to be accumulated for all of the block sizes that it forms a part of.

For this 4×4 block size, the cost measures calculated for the 4×4 (0,0) sub-block 74 are accumulated for the 4×4 (0,0) sub-block 74 as a block per se (step 105, FIG. 6). As the block size (4×4) is now equal to the sub-block size (4×4), the 4×4 (0,0) sub-block 74 is the last sub-block in the 4×4 (0,0) block 74 (step 106, FIG. 6), so the "yes" branch of the flow chart is followed. The system then reports the (accumulated) cost measures for the 4×4 (0,0) block 74 (step 109, FIG. 6), so that this can be used for determining how to encode the 4×4 (0,0) block 74, e.g. as a 4×4 (0,0) block 74 per se or as a 4×4 (0,0) sub-block 74 as part of the 8×8 block 72.

The 4×4 (0,0) block 74 is now the smallest block size for the block being assessed (step 107, FIG. 6) following reduction of the block size in order to accumulate the cost measures for the 4×4 (0,0) sub-block 74 for all of the block sizes that it forms a part of, so the "yes" branch in the flow chart is followed. The system then determines if the 4×4 (0,0) sub-block is the last sub-block in the 8×8 block 72 (step 110, FIG. 6). As it is not (there are three further 4×4 sub-blocks 76, 78, 80 in the 8×8 block 72), the "no" branch of the flow chart is followed and the next 4×4 (0,1) sub-block 76 is moved onto (step 111, FIG. 6).

The block size for which the cost measures are to be accumulated is once again set to the maximum block size, i.e. the 8×8 block 72 (step 103, FIG. 6). The same procedure as for the first 4×4 (0,0) sub-block 74 is then followed (steps 104-110, FIG. 6) to accumulate the cost measures (e.g. with cost measures that have been determined and written out previously for the same block) for all of the block sizes that the second 4×4 (0,1) sub-block 76 forms a part of.

Once this has been completed, the third 4×4 (1,0) sub-block 78 is then chosen (step 111, FIG. 6) and the process repeated in a similar manner. However, once the cost measures calculated for this 4×4 (1,0) sub-block 78 have been accumulated for the 8×8 block 72 (step 105, FIG. 6), and the "no" branch has been followed (because the third 4×4 (1,0) sub-block 78 is not the last sub-block of its size in the 8×8 block 72) (step 106, FIG. 6), the system determines whether the 8×8 block 72 is the smallest block size for which cost measures can be calculated (step 107, FIG. 6).

As the third 4×4 (1,0) sub-block 78 does not share the upper border of the 8×8 block 72 and so does not have an adjacent set of pixels 82 that are able to be used as the basis for the cost measures, the 8×8 block size is the smallest size, so the "yes" branch of the flow chart is followed and the fourth 4×4 (1,1) sub-block 80 is moved onto (step 111, FIG. 6).

A similar procedure is carried out for the fourth 4×4 (1,1) sub-block 80, with only the cost measures for the 8×8 block 72 being able to be accumulated (i.e. as per the third 4×4 (1,0) sub-block 78). After the cost measures calculated for the fourth 4×4 (1,1) sub-block 80 have been accumulated for the 8×8 block 72 (step 105, FIG. 6), the fourth 4×4 (1,1) sub-block 80 is then determined to be the last sub-block of its size in the 8×8 block 72 (step 106, FIG. 6). The accumulated cost measures for the 8×8 block can then be reported (step 109, FIG. 6).

Once the cost measures for all of the block sizes that the fourth 4×4 (1,1) sub-block 80 forms a part of have been calculated, accumulated and reported, the last sub-block has been reached (step 110, FIG. 6). Therefore the final "yes" branch of the flow chart is followed and the process of accumulating the cost measures for all of the block sizes within the 8×8 block 72 is complete (step 112, FIG. 6).

However, it will be appreciated that cost measures have not been able to be calculated for encoding each of the 4×4 sub-blocks 78, 80 as a 4×4 sub-block per se, because the cost measures for the 4×4 sub-blocks 78, 80 to be encoded as part of the 8×8 block 72 were not able to be re-used for these 4×4 sub-blocks 78, 80. The cost measures for encoding these 4×4 sub-blocks 78, 80 as 4×4 sub-blocks per se are therefore calculated and written out individually for each 4×4 sub-block 78, 80 using pixels from the neighbouring sub-blocks that are available.

This process may then be repeated for the next block of data elements to be considered, and so on.

Once all of the cost measures for a block (e.g. the 8×8 block 72 shown in FIG. 5) have been determined as outlined above, they can be used to determine the most cost effective way to encode the block, e.g. by encoding the 8×8 block as a whole relative to other blocks or by encoding each of the 4×4 sub-blocks separately relative to other sub-blocks. The block can then be encoded according to the chosen scheme.

As has been alluded to with reference to FIGS. 4a, 4b and 4c, as well as using different directions for projecting the pixels of neighbouring blocks into a block to be encoded to determine different encoding cost measures, different sizes of blocks within a frame of video image data may be chosen (e.g. a frame of video image data may be divided into multiple blocks in multiple different ways, e.g. with blocks divided into sub-blocks), over which different encoding cost measures (e.g. including for different projection directions) are determined. These cost measures can then be compared against each other (e.g. both different sized blocks and different projection directions) to determine the most cost effective encoding scheme for a frame of video image data.

For example, it may be that when determining predictions in smaller blocks, the residuals from the pixels in the neighbouring blocks(s) are smaller, e.g. owing to less variation in the video image data over a smaller distance, and therefore a lower cost to encode this video image data per se. However, there is an overhead cost associated with each cost measure and with encoding each block, which is therefore reduced when larger blocks are used. It will therefore depend on the nature of the video image data in the frame to be encoded and as such different block sizes and projection directions will generally be used to determine multiple different encoding cost measures for a frame of video image data.

The method described above is performed for each of the blocks in the frame and then for subsequent frames, e.g. when a frame is to be encoded using an intra-frame mode of encoding, in a sequence of frames.

Although the above embodiments have been described with reference to frames of video image data containing 8×8 blocks that are divided into 4×4 sub-blocks for the purposes of calculating the cost measures and subsequently encoding the frame, it will be appreciated that any suitable and desired size of blocks and sub-blocks may be used, e.g. depending on the size of the frame to be encoded. Furthermore, cost measures may be determined for each of three or more different sizes of blocks or sub-blocks such that the cost predictions for these may be compared and the frame encoded accordingly.

In another alternative to the above embodiments, e.g. as shown in FIG. 6, the cost measures may instead be calculated first for encoding sub-blocks per se, with these measures being re-used, where possible, for sub-blocks that are to be encoded as part of a larger block.

It will be appreciated from the above that the technology described herein, in embodiments at least, provides an improved method of and apparatus for generating a set of intra-frame encoding cost measures when encoding frames of video image data. This is achieved, in embodiments of the technology described herein at least, by determining a cost measure for a larger block of data elements of a video frame by determining respective cost measures for plural sub-blocks making up that larger block, and then combining the sub-block cost measures to provide a cost measure for the overall block. Furthermore, some or all of the determined sub-block cost measures may also be able to be used as cost measures for other block sizes being considered, and/or for the sub-blocks per se.

This then all helps to simplify and reduce the number of processing operations and the data needs to be stored for the encoding cost evaluations, such that the time taken to determine the cost measures and the power consumed when doing so can be reduced, without, for example, having to reduce the number of cost measures that are determined.

The foregoing detailed description has been presented for the purposes of illustration and description. It is not intended to be exhaustive or to limit the invention to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of generating an intra-frame encoding cost measure for a block of data elements of a video frame being encoded, the method comprising:
   for a block of data elements in a frame of video image data to be encoded using intra-frame encoding:
      determining a measure of the cost of encoding the block of data elements to be encoded when using data values of data elements of another block of data elements in the frame of video image data as a reference set of data values for the block of data elements to be encoded by:
      determining, for each sub-block of a set of plural sub-blocks of data elements making up the block of data elements to be encoded, a measure of the cost of encoding the sub-block when encoding the block of data elements to be encoded using data values of the data elements from the another block in the frame of video image data as a reference set of data values for the block of data elements to be encoded;
      determining the measure of the cost of encoding the block of data elements to be encoded using the determined cost measures for each of the sub-blocks of data elements making up the block of data elements; and
      using the determined cost measures for at least some of the sub-blocks of data elements making up the block of data elements also to determine a cost measure for intra-frame encoding a different block of data elements of the frame of video image data being encoded.

2. The method of claim 1, comprising determining cost measures for plural different blocks of data elements of the video frame being encoded.

3. The method of claim 1, comprising determining plural different cost measures for a block of data elements of the video frame being encoded.

4. The method of claim 1, comprising using a set of plural sub-blocks that each have the same size and shape for the purposes of determining the cost measure for the block of data elements.

5. The method of claim 1, wherein the sub-blocks comprise the smallest block size that is used for encoding purposes in the intra-frame encoding process.

6. The method of claim 1, wherein the cost measure that is determined for a sub-block of data elements comprises an SAD or an SATD measure for the sub-block of data elements.

7. The method of claim 1, comprising summing the determined cost measures for each of the sub-blocks to provide the cost measure for the block of data elements.

8. The method of claim 1, comprising:
   using the determined cost measure or measures to select how to encode all or part of the video frame using intra-frame encoding; and
   encoding a block or blocks of data elements of the video frame using the selected encoding.

9. A method of generating an intra-frame encoding cost measure for a block of data elements of a video frame being encoded, the method comprising:
   for a block of data elements in a frame of video image data to be encoded using intra-frame encoding:
      determining a measure of the cost of encoding the block of data elements to be encoded when using data values of data elements of another block of data elements in the frame of video image data as a reference set of data values for the block of data elements to be encoded by:
      determining, for each sub-block of a set of plural sub-blocks of data elements making up the block of data elements to be encoded, a measure of the cost of encoding the sub-block when encoding the block of data elements to be encoded using data values of the data elements from the another block in the frame of video image data as a reference set of data values for the block of data elements to be encoded;
      determining the measure of the cost of encoding the block of data elements to be encoded using the determined cost measures for each of the sub-blocks of data elements making up the block of data elements; and
   for at least one of the sub-blocks of data elements making up the block of data elements, using the cost measure determined for the purpose of determining the cost of encoding the larger block of data elements as a cost measure for intra-frame encoding the sub-block itself; and
   for at least one other sub-block making up the block of data elements, determining a new cost measure for intra-frame encoding the sub-block itself.

10. An apparatus for generating intra-frame encoding cost measures for blocks of data elements of video frames being encoded, the apparatus comprising:
   cost measure determining circuitry capable of determining, for a block of data elements in a frame of video image data to be encoded using intra-frame encoding, a measure of the cost of encoding the block of data elements to be encoded when using data values of data elements of another block of data elements in the frame of video image data as a reference set of data values for the block of data elements to be encoded by:
      determining, for each sub-block of a set of plural sub-blocks of data elements making up the block of data elements to be encoded, a measure of the cost of encoding the sub-block when encoding the block of data elements to be encoded using data values of the data elements from the another block in the frame of video image data as a reference set of data values for the block of data elements to be encoded; and determining the measure of the cost of encoding the block of data elements to be encoded using the determined cost measures for each of the sub-blocks of data elements making up the block of data elements;

wherein the cost measure determining circuitry is capable of using the determined cost measures for at least some of the sub-blocks of data elements making up the block of data elements also to determine a cost measure for intra-frame encoding a different block of data elements of the frame of video image data being encoded.

11. The apparatus of claim 10, wherein the cost measure determining circuitry is capable of determining cost measures for plural different blocks of data elements of the video frame being encoded.

12. The apparatus of claim 10, wherein the cost measure determining circuitry is capable of determining plural different cost measures for a block of data elements of the video frame being encoded.

13. The apparatus of claim 10, wherein the cost measure determining circuitry is capable of using a set of plural sub-blocks that each have the same size and shape for the purposes of determining the cost measure for the block of data elements.

14. The apparatus of claim 10, wherein the sub-blocks comprise the smallest block size that is used for encoding purposes in the intra-frame encoding process.

15. The apparatus of claim 10, wherein the cost measure that is determined for a sub-block of data elements comprises an SAD or an SATD measure for the sub-block of data elements.

16. The apparatus of claim 10, wherein the cost measure determining circuitry is capable of summing the determined cost measures for each of the sub-blocks to provide the cost measure for the block of data elements.

17. The apparatus of claim 10, further comprising:
encoding selection circuitry capable of using the determined cost measure or measures to select how to encode all or part of the video frame using intra-frame encoding; and
encoding circuitry capable of encoding a block or blocks of data elements of the video frame using the selected encoding.

18. An apparatus for generating intra-frame encoding cost measures for blocks of data elements of video frames being encoded, the apparatus comprising:
cost measure determining circuitry capable of determining, for a block of data elements in a frame of video image data to be encoded using intra-frame encoding, a measure of the cost of encoding the block of data elements to be encoded when using data values of data elements of another block of data elements in the frame of video image data as a reference set of data values for the block of data elements to be encoded by:
determining, for each sub-block of a set of plural sub-blocks of data elements making up the block of data elements to be encoded, a measure of the cost of encoding the sub-block when encoding the block of data elements to be encoded using data values of the data elements from the another block in the frame of video image data as a reference set of data values for the block of data elements to be encoded; and
determining the measure of the cost of encoding the block of data elements to be encoded using the determined cost measures for each of the sub-blocks of data elements making up the block of data elements;
wherein the cost measure determining circuitry is capable of:
for at least one of the sub-blocks of data elements making up the block of data elements, using the cost measure determined for the purpose of determining the cost of encoding the larger block of data elements as a cost measure for intra-frame encoding the sub-block itself; and
for at least one other sub-block making up the block of data elements, determining a new cost measure for intra-frame encoding the sub-block itself.

19. A computer readable storage medium storing computer software code which when executing on a data processor performs a method of generating an intra-frame encoding cost measure for a block of data elements of a video frame being encoded, the method comprising:
for a block of data elements in a frame of video image data to be encoded using intra-frame encoding:
determining a measure of the cost of encoding the block of data elements to be encoded when using data values of data elements of another block of data elements in the frame of video image data as a reference set of data values for the block of data elements to be encoded by:
determining, for each sub-block of a set of plural sub-blocks of data elements making up the block of data elements to be encoded, a measure of the cost of encoding the sub-block when encoding the block of data elements to be encoded using data values of the data elements from the another block in the frame of video image data as a reference set of data values for the block of data elements to be encoded;
determining the measure of the cost of encoding the block of data elements to be encoded using the determined cost measures for each of the sub-blocks of data elements making up the block of data elements; and
using the determined cost measures for at least some of the sub-blocks of data elements making up the block of data elements also to determine a cost measure for intra-frame encoding a different block of data elements of the frame of video image data being encoded.

20. A computer readable storage medium storing computer software code which when executing on a data processor performs a method of generating an intra-frame encoding cost measure for a block of data elements of a video frame being encoded, the method comprising:
for a block of data elements in a frame of video image data to be encoded using intra-frame encoding:
determining a measure of the cost of encoding the block of data elements to be encoded when using data values of data elements of another block of data elements in the frame of video image data as a reference set of data values for the block of data elements to be encoded by:
determining, for each sub-block of a set of plural sub-blocks of data elements making up the block of data elements to be encoded, a measure of the cost of encoding the sub-block when encoding the block of data elements to be encoded using data values of the data elements from the another block in the frame of video image data as a reference set of data values for the block of data elements to be encoded;

determining the measure of the cost of encoding the block of data elements to be encoded using the determined cost measures for each of the sub-blocks of data elements making up the block of data elements; and for at least one of the sub-blocks of data elements making up the block of data elements, using the cost measure determined for the purpose of determining the cost of encoding the larger block of data elements as a cost measure for intra-frame encoding the sub-block itself; and for at least one other sub-block making up the block of data elements, determining a new cost measure for intra-frame encoding the sub-block itself.

\* \* \* \* \*